United States Patent
Doron et al.

(10) Patent No.: US 11,606,387 B2
(45) Date of Patent: *Mar. 14, 2023

(54) TECHNIQUES FOR REDUCING THE TIME TO MITIGATE OF DDOS ATTACKS

(71) Applicant: RADWARE, LTD., Tel Aviv (IL)

(72) Inventors: Ehud Doron, Moddi'in (IL); Yotam Ben Ezra, Ra'anana (IL); David Aviv, Tel Aviv (IL)

(73) Assignee: RADWARE LTD., Tel Aviv (IL)

( * ) Notice: Subject to any disclaimer, the term of this patent is extended or adjusted under 35 U.S.C. 154(b) by 339 days.

This patent is subject to a terminal disclaimer.

(21) Appl. No.: 16/227,912

(22) Filed: Dec. 20, 2018

(65) Prior Publication Data
US 2019/0199746 A1    Jun. 27, 2019

Related U.S. Application Data

(60) Provisional application No. 62/608,854, filed on Dec. 21, 2017.

(51) Int. Cl.
*H04L 9/40* (2022.01)
*G06N 20/00* (2019.01)

(52) U.S. Cl.
CPC ......... *H04L 63/1458* (2013.01); *G06N 20/00* (2019.01)

(58) Field of Classification Search
CPC .............................. H04L 63/1458; G06N 20/00
See application file for complete search history.

(56) References Cited

U.S. PATENT DOCUMENTS

| | | | | |
|---|---|---|---|---|
| 9,483,742 | B1* | 11/2016 | Ahmed | H04L 63/1441 |
| 10,686,811 | B1* | 6/2020 | Ehle | H04L 63/20 |
| 2003/0110396 | A1* | 6/2003 | Lewis | H04L 63/1458 |
| | | | | 726/4 |
| 2007/0280114 | A1* | 12/2007 | Chao | H04L 47/10 |
| | | | | 370/235.1 |
| 2007/0283436 | A1* | 12/2007 | Duffield | H04L 63/1425 |
| | | | | 726/23 |
| 2010/0082513 | A1* | 4/2010 | Liu | G06N 3/006 |
| | | | | 706/46 |

(Continued)

OTHER PUBLICATIONS

R. G. Athreya and S. Thanukrishnan, "A Public Cloud Based SOA Workflow for Machine Learning Based Recommendation Algorithms," 2015 IEEE International Conference on Smart City/SocialCom/SustainCom (SmartCity), Chengdu, 2015, pp. 988-995, doi: 10.1109/SmartCity.2015.199. (Year: 2015).*

*Primary Examiner* — Michael Simitoski
*Assistant Examiner* — Hany S. Gadalla
(74) *Attorney, Agent, or Firm* — M&B IP Analysts, LLC

(57) ABSTRACT

A system and method for reducing a time to mitigate distributed denial of service (DDoS) attacks are provided. The method includes receiving a plurality of attack feeds on at least one protected object in a secured environment; analyzing the plurality of attack feeds to determine characteristics of a DDoS attack against the secure environment; determining a set of optimal mitigation resources assigned to the secured environment; selecting, based on the set of optimal mitigation resources and the attack characteristics, at least one optimal workflow scheme; and initiating a proactive mitigation action by setting each mitigation resource in the set of optimal mitigation resources according to the selected optimal workflow scheme.

17 Claims, 5 Drawing Sheets

(56) References Cited

U.S. PATENT DOCUMENTS

| | | | |
|---|---|---|---|
| 2013/0104230 A1* | 4/2013 | Tang | H04L 63/1458 726/23 |
| 2014/0047542 A1* | 2/2014 | Holloway | H04L 63/0281 726/23 |
| 2014/0215621 A1* | 7/2014 | Xaypanya | H04L 63/145 726/23 |
| 2015/0312273 A1* | 10/2015 | Pappu | H04L 43/026 726/23 |
| 2016/0021056 A1* | 1/2016 | Chesla | H04L 63/14 726/11 |
| 2016/0036837 A1* | 2/2016 | Jain | H04L 63/1416 726/23 |
| 2016/0044054 A1* | 2/2016 | Stiansen | H04L 63/1416 726/24 |
| 2017/0070531 A1* | 3/2017 | Huston, III | H04L 63/1416 |
| 2018/0054452 A1* | 2/2018 | Muddu | G06N 5/04 |
| 2018/0295154 A1* | 10/2018 | Crabtree | G06N 20/00 |
| 2020/0028874 A1* | 1/2020 | Lam | H04L 63/1416 |

\* cited by examiner

TECHNIQUES FOR REDUCING THE TIME TO MITIGATE OF DDOS ATTACKS

CROSS-REFERENCE TO RELATED APPLICATIONS

This application claims the benefit of U.S. Provisional Application No. 62/608,854 filed on Dec. 21, 2017, the contents of which are hereby incorporated by reference.

TECHNICAL FIELD

The present disclosure relates generally to cyber security, and more specifically to mitigating DDoS attacks.

BACKGROUND

In recent years, carriers, telephone companies, Internet service providers, and other service providers utilizing large scale networks, have been suffering from devastating denial of service (DoS) and distributed DoS (DDoS), (DoS and DDoS referred to collectively as DoS, merely for simplicity purposes), attack campaigns. DoS attackers typically have two major objectives: 1) to overwhelm various parts of the service provider's infrastructure to interfere with connectivity provided by the network, and 2) to attack services and end points to disrupt the services or their functionalities. Because service providers seek to provide high speed and reliable services, frequent DoS attacks may significantly affect business as customers become dissatisfied with poor service performance. Moreover, enterprises themselves, particularly medium and large enterprises, seek to protect their networks and systems from DoS attacks, as such attacks can hinder or completely stop normal business operations.

Some techniques for mitigating DoS attacks include: inline attack detection and mitigation, involving deploying a detector inline of traffic flows within an environment. The detector is configured to detect attacks based on traffic received at the detector and directed at another system in the environment. Other techniques for mitigating DoS attacks include out of path (OOP) attack detection and mitigation. When an attack is detected based on deviations from normal traffic flows, the attack traffic may be diverted to a "scrubbing center" configured to clean the attack traffic and redirect the cleaned traffic to the original destination. The attack detector can be deployed on premises, or as software, as a service (SaaS) in the cloud.

Over time, cyber-attackers have developed increasingly sophisticated techniques for disrupting target systems and services. One example of increasing sophistication of cyber-attacks is the rise of attack campaigns in which multiple attacks are utilized to exploit security weaknesses. In particular, a series of different types of attacks may be utilized to reveal and exploit vulnerabilities.

A major challenge in defending against sophisticated attack techniques is efficiently utilizing and operating security resources in order to optimize security and costs while abiding by best practices for mitigation. Specifically, the sophistication and high number of attacks that NOC and SOC teams confront on a daily basis is challenging. The human resources needed to defend against these attacks are not sustainable, and existing automated solutions do not sufficiently anticipate and address future stages of attacks. As a result, operating defenses against modern attacks is a heavy burden for network and application decision makers.

Further, existing systems for mitigating ongoing attacks only react to already ongoing attacks, and, consequently, often fail to mitigate some or all of the damage from the attacks. For example, traffic diversion to a scrubbing center may begin only after the attack has already brought down one or more systems. As a result, any mitigation may prove ineffective, or may otherwise allow damage that could have been prevented using appropriate mitigation actions. The ultimate goal of near zero time to mitigate can be hardly achieved.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for reducing a time to mitigate distributed denial of service (DDoS) attacks. The method includes receiving a plurality of attack feeds on at least one protected object in a secured environment; analyzing the plurality of attack feeds to determine characteristics of a DDoS attack against the secure environment; determining a set of optimal mitigation resources assigned to the secured environment; selecting, based on the set of optimal mitigation resources and the attack characteristics, at least one optimal workflow scheme; and initiating a proactive mitigation action by setting each mitigation resource in the set of optimal mitigation resources according to the selected optimal workflow scheme.

Certain embodiments disclosed herein include a system for reducing a time to mitigate distributed denial of service (DDoS) attacks. The system comprises a processing circuitry; and a memory, the memory containing instructions that, when executed by the processing system, configure the system to: reduce a time to mitigate of distributed denial of service (DDoS) attacks, comprising: receive a plurality of attack feeds on at least one protected object in a secured environment; analyze the plurality of attack feeds to determine the characteristics of a DDoS attack against the secure environment; determine a set of optimal mitigation resources assigned to the secured environment; select, based on the set of optimal mitigation resources and the attack characteristics, at least one optimal workflow scheme; and initiate a proactive mitigation action by setting each mitigation resource in the set of optimal mitigation resources according to the selected optimal workflow scheme.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
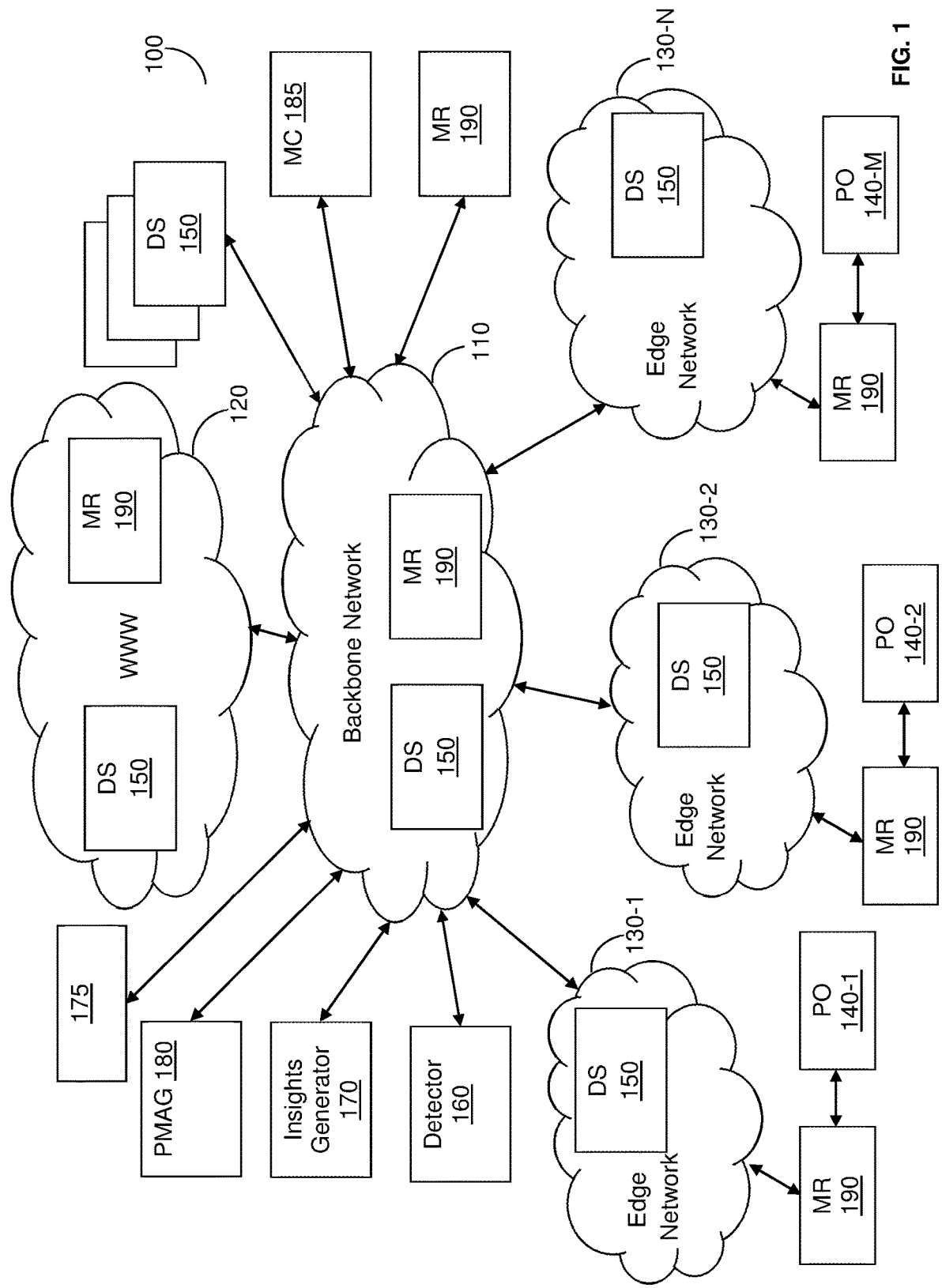
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for proactive mitigation of distributed denial of service (DDoS) attacks. The disclosed embodiments allow for proactive mitigation that addresses future steps (stages) of an on-going attack campaign (threat) or attack in advance. Various embodiments disclosed herein include receiving information on recognized patterns of DDoS attack campaigns and anticipating the next steps in an ongoing DDoS attack campaign. Availability of mitigation resources in an environment is determined. One or more workflow schemes are selected or dynamically created to efficiently and proactively mitigate the detected next steps of the attack or of the attack campaign. The workflow schemes are selected based on currently available mitigation resources and the detected attack type's nature and its next steps therein. Each workflow scheme defines information utilized to provision, manage, operate, monitor, and configure protection services to defend against cyber-attacks. Proactive mitigation is initiated by pre-setting available mitigation resources with the selected workflow schemes to mitigate near future coming attacks.

FIG. 1 shows an example network diagram 100 utilized to describe the various disclosed embodiments. The network 100 includes a backbone network 110 connected to the World Wide Web (WWW) 120 and to a plurality of edge networks 130-1 through 130-N (collectively referred to hereinafter as edge networks 130 or individually as an edge network 130). The backbone network 110 may be operated or maintained by an Internet service provider (ISP) or other service provider, a network carrier, a cloud provider, and the like. The edge network 130 may be a datacenter, an enterprise network, a mobile network, a data center network, a small or medium business, an IoT network, and the like.

An enterprise network is an enterprise's communications backbone that helps connect computers and related devices across departments and workgroup networks, facilitating insight and data accessibility. An enterprise network reduces communication protocols, facilitating system and device interoperability, as well as improved internal and external enterprise data management.

The edge network 130 allows access to a plurality of computing resources (not shown). Such resources may be accessed by any computing device, and therefor can be the target of DoS attacks.

As shown in FIG. 1, a plurality of protected objects 140-1 through 140-M (collectively referred to hereinafter as protected objects 140 or individually as a protected object 140) are connected to the edge networks 130. The protected object 140 may be a tenant, a computing infrastructure, a server or group of servers, services, or a combination thereof. In an example implementation, the protected object 140 is associated with a customer paying for the security services. A protected object 140 may be configured by an IP address for a dedicated server (for example, a single VM) protection, or by a variable size subnet for a network protection (a group of VMs or physical machine). The protected object 140, in one embodiment, can be a server, or a group of servers, deployed in the backbone network 110, the edge network 130, or both.

It should be emphasized that the disclosed embodiments can also be utilized to protect the infrastructure of the backbone network 110 or any one of the edge networks 130. Infrastructure protection means protection of all various network entities and their network interfaces, within the networks 110 and 130, from being overwhelmed in cases of DoS/DDos attacks. Such entities include routers, switches, firewalls, load balancers, and the like.

According to the disclosed embodiments, a plurality of data sources 150 are deployed in any of the backbone network 110, the edge networks 130, the World Wide Web, a combination thereof, and the like. Each of the data sources 150 collects or otherwise stores data related to traffic within the backbone network 110 and, more specifically, traffic directed to and from the protected objects 140.

In an example embodiment, the data sources 150 are deployed at an edge network 130 and the backbone network 110. The data sources 150 may include various security devices, deployed in the backbone network 110 or any of the edge networks 130. Examples for data sources 150 include routers collecting Flow data (e.g., NetFlow), Border Gateway Patrol (BGP) data, Simple Network Management Protocol (SNMP) data, attack detectors, attack mitigators, and the like.

In another example embodiment, the data sources 150 are part of the backbone network 110, and act as the management and service layer of network 110. Example for such sources are systems that provide Remote Authentication Dial-In User Services (RADIUS), DNS services, DHCP services, DPI services, and the like.

In yet another example embodiment, the data sources 150 may be Internet-based services (deployed in the WWW 120). Examples for such services include MaxMind, WHOIS, FarSight DNSDB, ShadowServer, Shodan, GeoIP, reputation data, threat intelligence and the like. Examples for additional data sources are provided below. Additional example data sources 150 may include, but are not limited to, SOCs and NOCs as well as their various databases and BI systems.

A detector 160 is deployed in the backbone network 110. The detector 160 may be an OOP detector or an inline detector. In various embodiments, different types of detectors are deployed in the network. In some configurations, the detector 160 is deployed as a service in the cloud.

The detector 160 may be configured to enrich Flow data (e.g., NetFlow) with data collected from a plurality of data sources 150. In an embodiment, based on the enriched Flow data, the detector 160 may be configured to detect DDoS attacks against one or more of the protected objects 140 or against the infrastructure itself.

The detector 160 may configured to dynamically create clusters of entities with common traffic and other behaviors.

An entity may include a destination IP address, a customer service, a mobile subscriber, a home subscriber, an ISP service, and the like. An entity may also include an external entity, such as an Internet service, a Web site, and so on.

To this end, enriched Flow data may be continuously analyzed using clustering and baselining algorithms for each source and destination of traffic according to one or more features. The features may include, but are not limited to, bandwidth level, whether the traffic is directed internally or externally with respect to a service provider network, whether statistics are stationary or not, a type of application, a type of subscriber, a type of IoT device, a reputation of the entity, combinations thereof, and/or the like. When clusters have been dynamically created, they may be utilized to detect attacks with respect to the appropriate clusters.

The detector 160 may be further configured to perform anomaly detection in various stages. A first stage may be an intra-cluster stage, or a history analysis stage, in which the behavior of each member of a cluster is compared to that of other members of the cluster. The first stage may result in identifying anomalies that are unusual for the cluster. A second stage may be an inter-stage, or peer group analysis, stage, in which behaviors of members of clusters are compared to those of members of other clusters. The anomaly detection may be performed using one or more machine learning techniques.

The operation of the detector 160 is described further in co-pending U.S. patent application Ser. No. 16/212,042, entitled SYSTEM AND METHOD FOR OUT OF PATH DDOS ATTACK DETECTION, assigned to the common assignee, the contents of which are hereby incorporated by reference.

In an example configuration, an insights generator 170 is configured to receive the enriched attack events data from the detector 160 or other attack events from the detection and mitigation entities as described herein above, and to generate insights based on the enriched events and other data from various data sources. The insights include: predictions of future attacks to be utilized in selecting workflows for mitigating the future attacks. The enriched events data may be received when anomalies are detected by the detector 160. The insights generator 170 is configured to utilize machine learning techniques to generate insights such as attack insights, threat insights, and environmental insights. Example techniques for generating insights are described further in U.S. Provisional patent application Ser. No. 16/216,335, entitled SYSTEM AND METHOD FOR PROVIDING INSIGHTS ON DISTRIBUTED DENIAL OF SERVICE ATTACKS, the contents of which are hereby incorporated by reference.

The predictions of upcoming attacks are determined based on incoming traffic data from the detector 160, the insights generator 170, or other detection and mitigation entities. The predictions are also based on supplementary data feeds. Examples of which are provided above. In some implementations, machine learning may be utilized to identify patterns of historical attack signatures to patterns of the incoming traffic data. In some implementations, the predictions may be determined by an attack predictor 175 and provided to the insights generator 170. Example techniques for predicting DDoS attacks are further described in U.S. Provisional patent application Ser. No. 16/215,878, entitled "TECHNIQUES FOR PREDICTING SUBSEQUENT ATTACKS IN ATTACK CAMPAIGNS," assigned to the common assignee, the contents of which are hereby incorporated by reference.

According to the disclosed embodiments, a proactive mitigation action generator (PMAG) 180 is configured to receive attack feeds from the detector 160, attack insights from the insights generator 170 and/or the attack predicator 175. The attack feeds include detection indication, attack insights, and attack predictions, provided by the detector 160, the insights generator 170, and/or the attack predicator 175. Some examples for the contents of the various attack feeds are mentioned below. The PMAG 180 may also receive supplementary data feeds from the data sources 150. Examples for data sources and their supplementary data feeds are provided above.

The PMAG 180 is configured to communicate with a mitigation controller 185 at least to provide a workflow scheme. The workflow scheme may be selected from existing schemes, created as new, or be an updated version of an existing scheme. The operation of PMAG 180 for providing a workflow scheme is discussed below with reference to FIG. 2. It should be noted that a workflow scheme defines at least a mitigation action. A mitigation scheme may be defined using different structures and attributes. Example of a workflow scheme defined according to an embodiment is discussed in detailed below.

The controller 185 is also configured to communicate with mitigation resources (MRs) 190 deployed within a number of positions on the network to determine the MRs availability, and to execute the selected workflow schemes for mitigating future attacks based on the available mitigation resources 190 and the current attack insights.

As illustrated in FIG. 1, a plurality of mitigation resources 190 are deployed at various tiers of the network 100. The mitigation resources tiers of the network 100 may be of high capacity, medium capacity, and/or low capacity. In an embodiment, the tiers of the network 100 may be defined as defense tiers including: a cloud-tier (tier-0), a backbone-tier (tier-1), an edge-tier (tier-2), and an entity-tier (tier-3). For example, the high capacity mitigation resources 190 would be deployed in the backbone network 110, as a scrubbing center, mainly configured to handle network layer attacks to protect the backbone network 110. Along with Layer-4 detection and mitigation, the high capacity mitigation resources 190 can also handle Layer-7 based attacks.

In some implementations, the cloud-tier (tier-0) includes a scrubbing center (not shown) operable or communicatively connected in the WWW 120. The cloud-based scrubbing center is configured to clean high volumes of malicious traffic that typically cannot be efficiently handled by resources of the backbone network 110.

In some embodiments, the high capacity mitigation resources 190 can be deployed in different locations at the backbone-tier (tier-1) including, but not limited to, peers of the backbone network 110 or at a number of scrubbing centers. The deployment mode of a high capacity mitigation resource 190 may be, for example, inline, out of path (OOP), local out of path (LOOP), or in-device (e.g., a mitigation device that is embedded in another networking element, such as a switch or router).

The mitigation resources 190 may include medium capacity mitigation resources designed to protect the edge-tier (or tier-2), i.e., the various edge networks 130. The medium capacity mitigation resources 190 are configured to detect, mitigate, or both DDoS attacks at the application layer (layer-7), at the network layer (layer 4), or both, per customer or other edge type of network.

The mitigation resources 190 may also include low capacity mitigation resources 190 deployed as an entity-tier (tier-3) to directly secure the protected objects 140. The low capacity mitigation resources 190 are configured to mitigate DDoS attacks at the application layer (layer-7), at the network layer (layer 4), or both, per protected object (e.g., a device of a tenant or customer). This allows for the implementation of security mechanisms per a specific network location, tenant, and/or the like. The specific security mechanism to be utilized may be determined by a security policy. It should be noted that typical implementations of each of the tier-2 and tier-3 mitigation resources include, as a whole, the aggregation of resources that provide high capacity resources.

The low capacity mitigation resources 190 can be deployed as an application layer (virtual) in Inline, LOOP, in-device, or a virtual appliance (in-server). In certain implementations, a low capacity mitigation resource 190 can be provisioned with lower security capabilities and can even act as a probe device for attack detection purposes only. In such implementations, a low capacity mitigation resource 190, acting as a probe, is directly connected to a protected tenant (e.g., a VM).

It should be noted that the low, medium, or high capacity mitigation resources 190 are utilized only between the different resources and are configured to determine their capacity relative to each other. It should be further noted that a mitigation resource 190 can be a virtual machine, a physical machine, or a combination thereof. In an embodiment, when the mitigation resource 190 is a virtual machine, the capacity of the mitigation resource 190 can be elastically increased.

It should be further noted that the capacity of a mitigation resource 190 does not relate only to the amount of traffic that a resource can process, but also to mitigation and detection capabilities (generally referred to as "security capabilities") that such a resource is configured with. For example, one mitigation resource 190 can be configured with advance challenges to detect bots, while another mitigation resource 190 cannot perform any challenges.

According to the disclosed embodiments, the PMAG 180 is configured to reduce the time to mitigate DDoS attacks that may or may not be part of an attack campaign, by issuing the proactive mitigation action. This ensures maximum utilization and best optimal usage of each mitigation resource 190 in the network 100 at any stage of an attack and also future step of an on-going attack campaign of any scale. In some implementations, the proactive PMAG 180 is configured to process the received attack feeds, and relevant supplementary data peers, to determine an optimal workflow scheme operating the mitigation resources 190. The selected optimal workflow scheme, when applied, allows for a faster mitigation of a current detected attack or a future step of the attack. The selected optimal mitigation can be set ahead of the actual attack launching time, thereby allowing for the mitigation of an attack that has zero time to mitigate.

In an embodiment, when an optimal exiting workflow scheme cannot be identified, the PMAG 180 may create a new workflow scheme that would optimally mitigate the attack. It should be noted that the proactive mitigation controller 180 may be preconfigured with a list of workflow schemes.

Following are some examples for selecting an optimal workflow scheme based on the attack feeds. For example, in OOP mitigation, a workflow that causes traffic redirection, even though there is no active attack in place, may be selected. As another example, for inline mitigation, a workflow scheme that checks if the policy configured in the inline device fits the predictive attacks (e.g., L7 attack and no HTTP policy mitigation exists), then such mitigation is ruled to this policy.

As another example for, both OOP and inline mitigation, selecting a workflow scheme defining attack signatures utilized "in the past" at one customer, to mitigate the next coming attack. The attack signatures are part of the attack feeds. As yet another example, both OOP and inline mitigation, the attack feeds indicate that the next incoming attack will have: high bandwidth capacity, and/or a workflow scheme that defines traffic blocking to redirect the traffic to the cloud scrubbing mitigation resource. In regards to both OOP and inline mitigation, if the attack feeds indicate that the attack traffic comes from TOR exit node (or other bad sources), a workflow scheme blocking traffic through the TOR exit node is selected. Also in regards to both OOP and inline mitigation, if the attack feeds indicate that the attack traffic is NTP (or UDP) traffic, a workflow scheme configured to block such traffic is selected. As can be demonstrated by the above example there is a direct correlation between the attack fees and workflow scheme selected to block the attack.

It should be noted that any operations of any mitigation resource 190 can be configured through a workflow scheme. In an embodiment, a workflow scheme includes information utilized to provision, manage, operate, monitor and configure protection services in the mitigation resources 190. Such information may indicate, but is not limited to, operation regimens defining actions to be performed after provisioning as well as provisioning instructions, attributes required for performing the actions, triggering criteria for initiating or terminating operation regimens, resources for detecting trigger events, classifications of network and mitigation resources, and the like. Each set of triggering criterion may correspond to an initiation or termination of a particular operation regimen such that, upon satisfaction of the triggering criteria, the corresponding operation regimen is initiated or terminated.

In an embodiment, the workflow scheme may be further assigned to one or more of the protected objects 140. In another embodiment, the workflow scheme may be subsequently reassigned to one or more protected entities in the network 100. Such assignment and reassignment allow each workflow scheme to be utilized for multiple protected entities at once or at different times, thereby allowing for increased flexibility via selective assignment of workflow schemes to protective resources based on, e.g., organizational or other network security needs, and according to operational requirements of on-going attacks.

In an embodiment, a workflow scheme includes at least one operation regimen to be activated upon a security service setup, during trigger fulfilments, or both. For example, the provisioning may include all activities needed to initiate a new security service such as: configuring a new policy or a mode on a mitigation resource 190, redirecting traffic to or from the mitigation resource 190, and so on. The operation regimen may be utilized to automatically configure one or more networks, network elements, mitigation resources, or a combination thereof, to perform actions defined in an operation regimen for detecting security threats, mitigating security threats, or both, with respect to a network topology.

In an embodiment, an operation regimen's action may be a mitigation defined with attributes related to a policy to be utilized by a mitigation resource 190 assigned to protect the protected entities. In another embodiment, an operation regimen's action may be diversion based on the attributes to traffic redirection through, for example, routers to issue BGP updates with, BGP ASN, BGP Community, VPN identifiers, and so on. In another embodiment, an operation regimen's action may be blocking and includes attributes related to blocking rules defined using, for example, BGP or BGP FlowSpec traffic signatures to block, BGP Communities, and so on.

Each triggering criterion is based on an internal or external trigger event utilized to determine when to initiate or terminate a particular operation regimen. Each trigger event may be further associated with one or more mitigation resources and trigger one or more operation regimen. Upon satisfaction of the triggering criteria for at least one operation regimen, actions defined in the operation regimen may be executed or terminated. Detailed discussion and examples for workflow schemes are provided below.

In an embodiment, the workflow scheme includes a provisioning direction set, defining one or more default operation regimens to be activated upon an initial security service setup. Utilizing workflow schemes for operation protection services is described further in U.S. patent Ser. No. 10/033,758, entitled "SYSTEM AND METHOD FOR OPERATING PROTECTION SERVICES," assigned to the common assignee, the contents of which are hereby incorporated by reference.

It should be noted that the disclosed embodiments may be utilized to defend any or all of the entities shown in FIG. 1. The environments protected according to the disclosed embodiments may equally include environments operated by individual enterprises or a common enterprise. It should be further noted that the PMAG 180 can be part of a security system including the detector 160, the insights generator 170, and the attack predictor 175.

Figure 2:
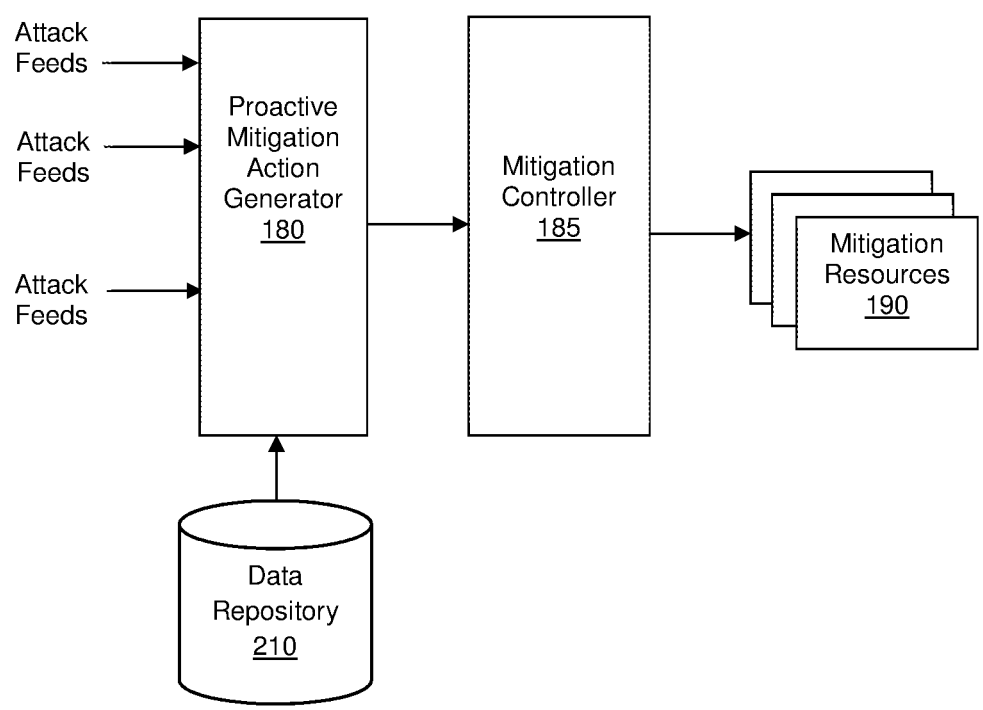
FIG. 2 is a flow diagram illustrating detection by the DDoS detector according to an embodiment.

FIG. 2 is an example flow diagram utilized to describe the operation of the data PMAG 180 according to some embodiments.

The inputs to the PMAG 180 are attack feeds. Such feeds carry information on a current DDoS attack and/or a subsequent step in the DDoS attack. The detected DDoS attack may be part of a DDoS attack campaign.

The attack feeds may include attack indications provided by the attack detector 160, insights generated by the insights generator 170, and attack predictions generated by the attack predictor 175. In some embodiments, attack feeds may include enriched data sets. Examples for such attack feeds are provided below.

The attack feeds may be received in real-time. It should be noted that a large number of attack feeds may be received, where with each attack feed having different characteristics and attributes.

To this end, in an embodiment, the PMAG 180 is configured to utilize machine learning techniques for analyzing the attack feeds. Using machine learning techniques, the PMAG 180 is configured to characterize the attack to determine the properties of the attacks. The attack characteristics may include, but are not limited to attack direction, attack volume, attack signatures, attack patterns, and so on.

In an embodiment, a set of optimal mitigation resources assigned to the secured environment are determined. The determination of such resources is based on a type, location, status and/or availability of each mitigation resource 190 as further described below. The set of optimal mitigation resources can also be based on attack characteristics.

Based on the attack characteristics and optimal set of mitigation resources, the PMAG 180 may select a workflow scheme that would optimally mitigate the attack. The selection may be from workflow schemes saved in the data repository 210. Various examples for selecting the optimal workflow scheme are provided above.

In an embodiment, if the workflow schemes are not found in the data repository 210, the PMAG 180 is configured to create a new workflow scheme. The creation of such scheme can be performed using a machine learning technique, based on, the building blocks of a workflow scheme (operation regimens and triggering criteria) adapted to meet the attack characteristics.

In another embodiment, the PMAG 180 is configured to update an existing workflow scheme to meet the attack characteristics, thereby providing an optimal workflow scheme to mitigate the attack.

The PMAG 180 is configured to set the controller 185 with the optional workflow scheme. The controller 185, on its turn, configures one or more mitigation resource 190 with the optimal workflow scheme 180. It should be appreciated that the selection of the optimal workflow scheme and configuration of mitigation resources 190 reduces the time for mitigation, as these operations are performed in an automated way without any input from a user (e.g., a security administrator).

Further, selection or creation of workflow schemes based on attack characteristics, by the PMAG 180, ensures accurate and fast mitigation of a current attack and/or a subsequent attack. For example, one of the determined attack characteristics may include the attack signature. The optimal workflow scheme provisioned to block traffic with the attack signatures are propagated through the mitigation resources 190.

In yet another embodiment, the PMAG 180 is configured to use machine learning techniques, to identify DDoS attacks of which occurred in the past and have similar, current or future predicted attacks. Based on this knowledge, the PMAG 180 is configured to proactively build a workflow scheme for an optimal mitigation. The PMAG 180 is in charge of using the accurate attack signatures, such as layer 3 and layer 4 header information (e.g. packet size, sources and IP destinations, TCP source and destination ports, TTL, TOS and a like) layer 7 information (e.g., HTTP requests size, HTTP response size, HTTP verb, user agent, WEB cookie, etc.) to accurately mitigate existing attacks with optimal time to mitigate. In another embodiment, the optimal attack mitigation is gained by reducing time needed to build the initial attack mitigation, and therefore allowing for minimum possible time to mitigate by proactively configuring the attack signatures to the selected optimal mitigation resources.

In an implementation, the PMAG 180 can be deployed on premises, or as software as a service (SaaS) in the cloud.

Figure 3:
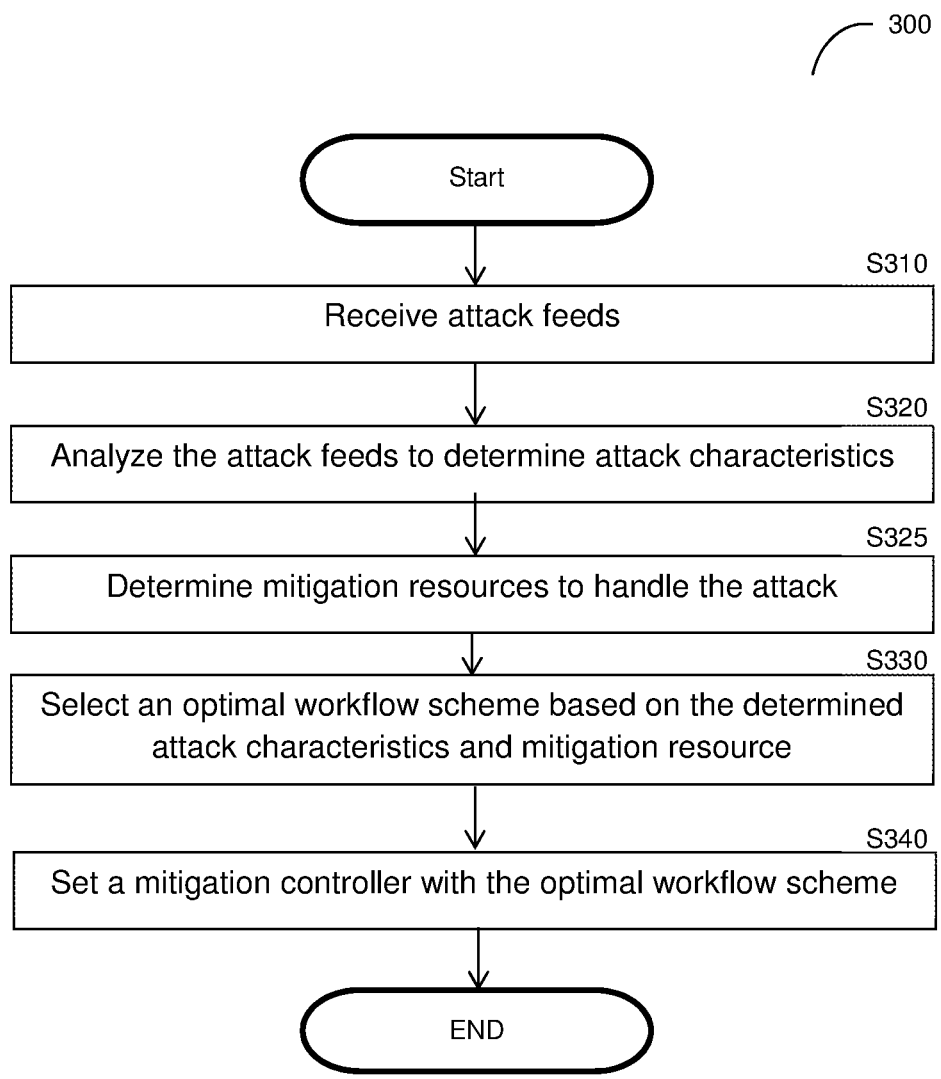
FIG. 3 is a flowchart illustrating a method for proactively mitigating DDoS attacks according to an embodiment.

FIG. 3 is an example flowchart 300 illustrating a method for proactively mitigating DDoS attacks according to an embodiment.

At S310, attack feeds are received from one or more resources. The attack feeds include information on a current DDoS attack and/or a subsequent step in the DDoS attack. The detected DDoS attack may be part of a DDoS attack campaign. As mentioned above, the attack feeds may include attack indications, attack insights, and attack predictions.

At S320, the attack feeds are analyzed to determine at least the characteristics of an attack or a next step of the attack as discussed above.

At S325, a set of optimal mitigation resources assigned to the secured environment are determined. The determination is based on the type and location of each mitigation resource assigned to secure the environment. In an embodiment, S320 may also include checking if the status and availability of each a mitigation resource is currently available as well as the current load, based on the load parameters, on the mitigation resource. Examples for load parameters include a CPU load condition, a memory load condition, a number of provisioned security services, a ratio between an amount of current used security services and an amount of a total security service, a load condition of a link connecting the protected object, and so on. In an embodiment, the load of links connecting the protected objects is also monitored. This can be utilized to determine the load on the mitigation resource assigned to secure the protected entity. In an example implementation, a signal may be received from overloaded capacity mitigation resources. Such a signal can indicate that the resources cannot handle additional threats.

At S330, based on the available set of mitigation resources and the determined attack characteristics, at least one optimal workflow scheme is selected. The selection is made from a set of predefined lists of workflow schemes. The optimal workflow scheme defines information utilized to provision, manage, operate, monitor, and configure protection services to defend against cyber-attacks. In an embodiment, the S330 may include creating a new workflow scheme or updating an existing one to optimally meet the attack characteristics and available mitigation resources. The optimal workflow scheme would best handle the current DDoS attack and the next steps attacks in the DDoS attack campaign. For example, if the next step of threat is a very high bandwidth attack, then a scrubbing center would be selected to perform traffic blocking.

At S340, a mitigation controller is set with the at least one optimal workflow scheme. Any mitigation resource provisioned with the optimal workflow scheme initiates a proactive mitigation action as defined in the respective scheme. Operating mitigation resources to mitigate attacks using workflow schemes is described further herein below with respect to FIG. 4.

In some implementations, multiple attacks may be predicted, either at the same time or as additional relevant data is received, and a workflow scheme may be selected for each attack. Each workflow scheme may be implemented at a time that allows for mitigating the respective predicted attack (e.g., at a predetermined amount of time before the predicted attack is expected to begin, upon detection of a predetermined event, and the like).

In an embodiment, S340 may further include checking whether default or otherwise already-in-use mitigation actions are optimal and, if so, continuing such mitigation actions. To this end, S340 may include, for example, selecting a workflow to mitigate a predicted attack and comparing the selected workflow to a workflow that is currently being utilized.

It should be noted that S340 may include modifying a workflow scheme, configuring a new security service with a mitigation resource, or both. For example, if the scheme in an inline mitigation resource cannot handle a L7 attack due to lack of HTTP mitigation policy, then the mitigation resource will be configured with that policy, or a new workflow that includes mitigation resources that support HTTP mitigation policy shall be suggested and configured by the PMAG 180. As another example, configurations across resources assigned to different objects (tenants) may be matched so that all such configurations are the same.

In an embodiment, upon receiving an indication that the attack has been mitigated or ended, the configuration of the selected mitigation resources can be reverted to a peace mode configuration. The peace mode configuration may be a default configuration of each mitigation resource. In an embodiment, the method is performed by the PMAG 180, of FIG. 1. In another implementation, the method is performed by a dedicated entity for proactive mitigation actions generation.

Figure 4:
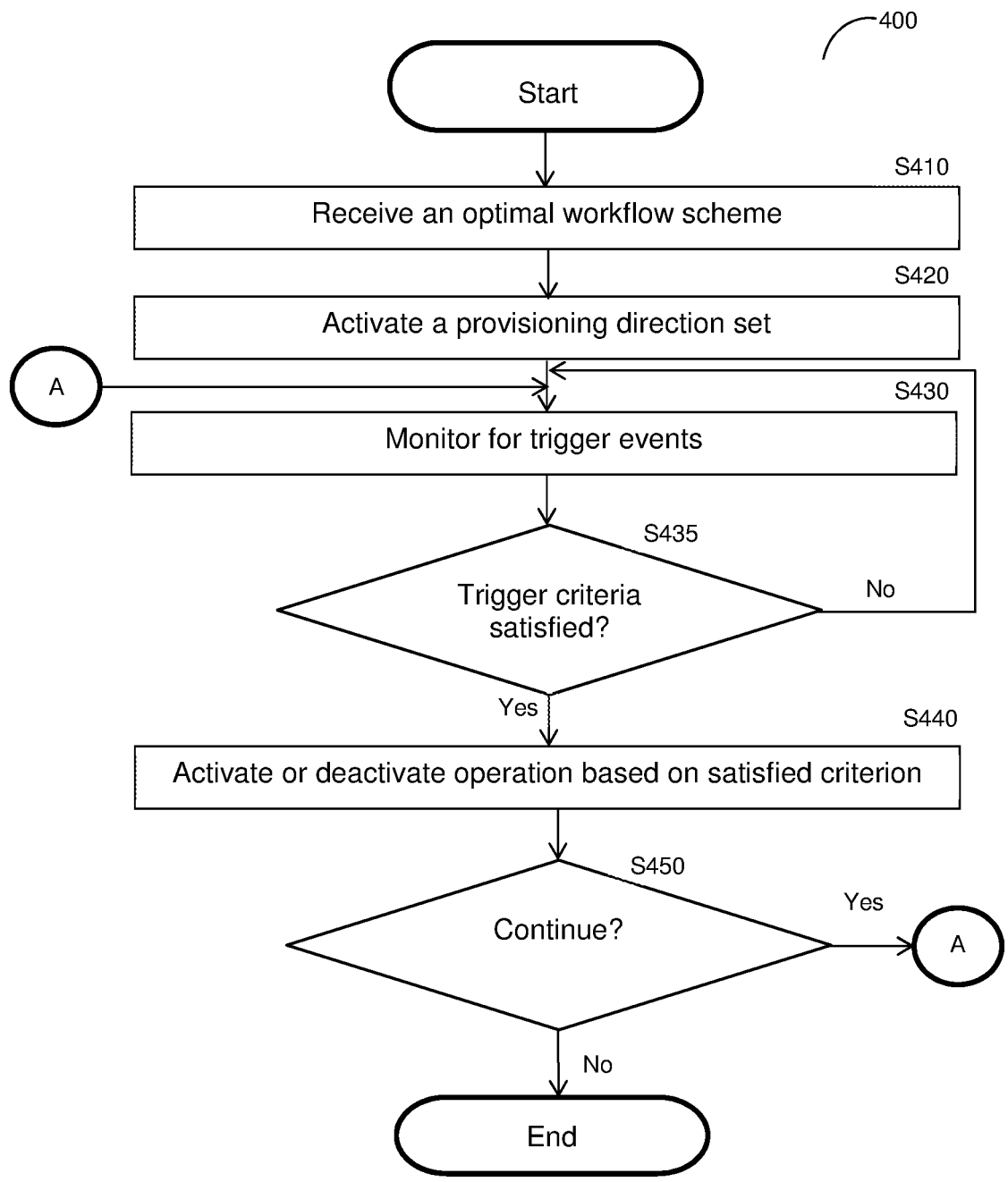
FIG. 4 is a flowchart describing a method for operating protection services based on workflow schemes according to an embodiment.

FIG. 4 is an example flowchart 400 illustrating a method for operating protection services based on workflow schemes according to an embodiment. The method allows for providing flexible and automatically generated configurations and responses to possible cyber security threats based on predetermined settings.

At S410, the optimal workflow scheme is received at the mitigator controller. In an embodiment, the optimal workflow scheme may be one of a plurality of predetermined workflow schemes generated based on, e.g., user inputs, security needs of the specific service, or both. Generating the workflow scheme based on user inputs allows for, e.g., a customer to configure or build the workflow scheme as needed. In another embodiment, the workflow scheme may be selected from among a plurality of predetermined workflow scheme (i.e., "out of the box" scheme). In yet another embodiment, the workflow scheme may be customized based on known security needs.

The optimal workflow scheme may be further assigned to one or more protected entities in an environment. In another embodiment, the workflow scheme may be subsequently reassigned to one or more protected entities in the environment. Such assignment and reassignment allows each workflow scheme to be utilized for multiple protected entities at one time or at different times, thereby allowing for increased flexibility and easier operations via selective assignment of workflow schemes to protective resources based on, e.g., organizational or other network security needs.

A workflow scheme includes all information utilized to provision, manage, operate, and configure protection services in the mitigation resources available in the environment. Such information may indicate, but is not limited to, operation regimens defining actions to be performed after provisioning as well as provisioning instructions, triggering criteria for initiating or terminating operation regimens, resources for detecting trigger events, classifications of network and other entities to protect (ASN, BGP Community, FQDN, and such), mitigation resources, and the like. Each set of triggering criteria may correspond to an initiation or termination of a particular operation regimen, or set of operation regimens such that, upon satisfaction of the set of triggering criteria, the corresponding operation regimen is initiated or terminated, in order to meet the security need as defined by the triggering criteria.

The operation regimens typically define one or more actions to be performed and groups of resources and relevant attributes required for performing these actions. In an embodiment, each operation regimen activates a security policy on a set of pre-defined mitigation resources, that may be based on a pre-defined template. Each operation regimen may include, but is not limited to, actions to be performed in response to a cyber security threat or any other environmental or security event, parameters for performing the actions, and the like. The actions may include activation of any security capability of any component of the environment such as, but not limited to, provisioning additional mitigation resources, such as detection resources, mitigation resources, or both. The mitigation actions may include, but are not limited to, mitigation actions such as, e.g., provisioning of the required mitigation resources with the required security polices, diverting or injecting traffic, blocking traffic to one or more protected object, notifying a user of a potential cyber security threat (e.g. sending an email, a text message, end the like), a user-defined action, and the like. In a further embodiment, the actions may further include customized actions based on, for example, user inputs.

Tn operation regimen may include relevant attributes needed to realize the required actions. For example, the actions may include mitigation, diversion, blocking, or user-defined actions. Following are some examples for action's attributes. The diversion action' attributes may include BGP or BGP FlowSpec attributes, such as routers to issue BGP updates with, BGP ASN, BGP Community, Dirty/Clean VPN identifiers, and the like. The blocking action's attributes may include traffic signatures to be blocked, BGP Communities, and so on. The mitigation action may include the group of mitigation resources and the required polices, or templates, to provision on each group member.

The attributes may include parameters used to configure mitigation resources, to perform the actions defined in the operation regimen, and the like. The parameters may further indicate the mitigation resources to perform particular mitigation, or other, actions. In an example embodiment, the parameters may indicate groups of mitigation resources such as, but not limited to, mitigation groups i.e., a group of mitigation resources assigned to perform mitigation. In addition, the parameters can include the diversion group network elements (routers, switches, etc.) identifiers and relevant attributes. These attributes are needed for traffic diversion from the diversion group members to the specified mitigation resources. Another type of parameter can be injection attributes needed for injecting back clean traffic from mitigation resources to the protected entity. Blocking attributes, i.e., blocking group and blocking methods, can be specified when the relevant action is blocked. The mitigation, diversion, injection, and blocking attributes can be defined in reusable templates.

The provisioning direction set defines at least one default operation regimen to be activated upon an initial security service setup. The provisioning direction set may be utilized to automatically configure one or more network and mitigation resources to perform the mitigation actions defined in an operation regimen for detecting security threats, mitigating security threats, or both, with respect to a network topology. The operation regimen can define which security policy should be utilized by a mitigator. Such security policies can be defined in templates of the mitigator. That is, the provisioning can be related to protected entities, sub-networks, applications, links, and the like. In an embodiment, the provisioning direction set may be implemented as a default operation regimen utilized when no other operation regimen is being executed. In another embodiment, the provisioning direction set can be set at always on operation, for example, mitigation of attacks in an out-of-path manner.

Each triggering criterion is based on an internal or external trigger event utilized to determine when to initiate or terminate a particular operation regimen. Each trigger event may be further associated with a particular resource. For example, a trigger event may be detection of a bandwidth above 500 Gbps detected by a particular detector. In an embodiment, the triggering criteria for an operation regimen activation may be further based on a combination of trigger events.

In an embodiment, the triggering criteria may be based on alternative trigger events (i.e., if any of the trigger events occurs, the triggering criteria is satisfied), joint trigger events (i.e., the triggering criteria is satisfied only if two or more trigger events occur), alternative combinations of trigger events (i.e., the triggering criteria is satisfied if any particular combination of trigger events occurs). It should be noted that any other combinations for triggering event logical expressions, and their various properties, can be applied here as well.

Upon satisfaction of the triggering criteria for an operation regimen, actions defined in an associated operation regimen may be executed or terminated. A trigger event may represent any kind of event occurring in the environment, e.g., the start or end of a cyberattack of a specific type. Types of trigger events may include, but are not limited to, receiving an inbound indication, a status change, an attack type, detection of suspicious traffic, a particular link in the environment being saturated, and the like. Whether a criterion has been satisfied may be based on, but is not limited to, a type of trigger event detected, a severity of a detected trigger event, a traffic volume related to each detected trigger event, combinations thereof, and the like.

Example trigger events may include, but are not limited to, a security service provision start, a provision end, a start or end of an attack as determined by a particular detector, bandwidth of an attack (e.g., greater than, less than, or equal to a particular bandwidth value, or a combination thereof), a risk of an attack (e.g., low, medium, high, combinations thereof, etc.), a particular attack protocol (e.g., TCP, HTTP, IP), an attack type (Layer 3-4, Layer 7), a mitigator link bandwidth (e.g., greater than, less than, or equal to a particular bandwidth value, or a combination thereof), customized trigger events defined based on user inputs, a timer since startup/end of another operation, a timer since start/end of attack, a mitigation device health change, a router status change, a peace time traffic volume change, a predefined schedule (time of the day, a day of the week, etc.), executing pre-defined scripts, combinations thereof, and the like.

In an embodiment, triggering criteria, and their attributes, may be stored in a trigger table along with their corresponding operation regimen, provisioning direction set, or both. Each entry in the trigger table may indicate, but is not limited to, a start triggering criterion (when satisfied, triggers initiation of an operation regimen), an end triggering criterion (when satisfied, triggers termination of an operation regimen), or a corresponding operation regimen. In some embodiments, the criteria can be formatted as a set of logical expressions, such as "or", "and", "not", and the like, on a group of triggers. In an embodiment, the user can define whether the operation regimen can be automatically activated upon trigger satisfaction, or the user can have the ability to manually confirm the activation of an operation regimen when a trigger is satisfied.

It should be noted that a set of workflow schemes can be predetermined and applied to configure the mitigation resources automatically or on-demand. The main building blocks of a workflow scheme are operation regimens and triggering criteria. In an embodiment, predefined sets of operation regimens, triggering criteria, or both, are provided to create a new scheme or to modify an existing scheme. A workflow scheme can be utilized for provisioning, managing, monitoring, or operating the resources, or a combination thereof, to protect a plurality of protected entities. That is, one workflow scheme can be applied to many entities. Therefore, instead of provisioning and managing the resources for each protected entity separately (there are typically thousands of such entities in a large-scale network), one workflow scheme can be reused for hundreds of entities with similar protection attributes. This would simplify the provisioning and management of mitigation resources and network elements in the large-scale network.

It should be noted that all the generated workflow schemes are saved or accessible by the security control system. The security control system, when executing the disclosed method, can operate, and execute, the protection services based on the generated or selected workflow scheme.

Returning to FIG. 4, at optional S420, a provisioning direction set defining at least one default operation regimen may be activated. The provisioning direction set is part of the generated workflow scheme. The provisioning direction set, when activated, can cause initial provisioning and operating of one or more of the mitigation resources to redirect traffic and so on.

In an optional embodiment, S420 may include, but is not limited to, selecting appropriate mitigation resources based on, for example, capacity, load, security capabilities, or a combination thereof. The selection may further be based on monitoring of load and availability for each mitigation resource.

At S430, protected entities, resources, or both, in the environment are monitored for trigger events. The monitoring may include, but is not limited to, collecting cyber security metrics, signals, or both, from mitigation resources configured as detectors, collecting link load statuses from network elements, and the like. Specifically, the cyber security metrics may be collected from one or more of the detectors indicated in the workflow scheme. Based on the monitoring, it may be determined whether the triggering criteria for an operation regimen has been satisfied. As noted above, satisfaction of the triggering criteria may be based on types, severities, or volumes related to trigger events, or a combination thereof. It should be noted that determining if the triggering criteria is satisfied can be performed by the mitigation resource (e.g., a detector) configured with the triggering criteria or by the security control controller system that receives signals or metrics from the mitigation resources.

At S435, a check is made if the trigger events satisfy one or more of the triggering criteria. If so, execution returns to S440; otherwise, execution continues with S430.

At S440, upon satisfaction of the triggering criteria for an operation regimen, activation or deactivation of at least one corresponding operation regimen may be caused. The operation regimen to be executed or terminated may be determined based on the trigger list, listing at least the satisfied triggering criteria. In an embodiment, S540 may further include prompting a user for permission, or confirmation, to cause the operation regimen. In another embodiment, a notification may be sent to the user regarding the satisfaction of criteria for a particular operation regimen.

The activation of an operation regimen includes provisioning and the operation of each mitigation resource defined in the regimen (e.g., defined in a mitigation group). As discussed above, the mitigation resources may include attack mitigators, detectors and various network elements, external mitigation resources in the cloud, or a combination thereof. The attack mitigators can be defined by a mitigation group defined in the operation regimen and are activated/configured when the action in the workflow is "mitigate". The network elements are defined by a blocking group and are configured to block traffic when the action in the workflow is set to "blocking". In an embodiment, the configuration of such network elements can be performed via protocols including, but not limited to, BGP, FlowSpec, OpenFlow, and the like, to modify forwarding tables, ACLs, and the like of such elements.

The detectors may include various entities that can signal an attack, a measurement of network activity, or both. For example, detectors may include the central control, an internal detector, an external detector (e.g., detector 160), an insights generator (170, FIG. 1), an attack predicator (175, FIG. 1), SIEM systems, mitigators that provide attack indication, WAF services, and user input (e.g., by a security operation team) that triggers an attack. In an embodiment, the triggering criteria can be based on aggregated inputs from multiple detectors, defined by the detector group, thereby considering each individual detector indicated in the group. For example, one detector from the group may consider the attack as terminated, but another detector may consider the attack as still on-going. In such a case, the aggregation considers the attack as still ongoing.

At S450, it is determined additional workflow schemes should be selected, and, if so, execution continues with S430; otherwise, execution terminates. In an embodiment, a workflow scheme may be selected for, e.g., each predicted future attack.

It should be appreciated that, using the disclosed method, a complete security service can be defined to defend the protected entities. Through the selection and utilization of workflow schemes, the entities to be protected are assigned and actions to secure such entities are defined. A protected entity assignment in a workflow scheme can be defined using, for example, a CIDR prefix, an IP address, a BGP Community, an ASN, a FQDN, a URI, E.164 field, and the like.

Operating protection services utilizing workflow schemes and, in particular, for multi-tiered networks, is described further in U.S. patent Ser. No. 10/033,758 referenced above.

It should be noted that various embodiments described herein are discussed with respect to proactively mitigating DDoS attacks merely for simplicity purposes, and that other types of DoS attacks may be equally detected in accordance with the disclosed embodiments. Additionally, the disclosed embodiments are described with respect to one mitigator-controller, but may be equally implemented using multiple mitigator-controllers configured to operate alternatively, or to share the work between them. Further, in some embodiments, the sources of data utilized by different mitigator-controllers may be different.

The disclosed embodiments may be implemented on-premises of a network, may be implemented remotely (for example as Software-as-a-Service (SaaS), or a combination thereof.

Figure 5:
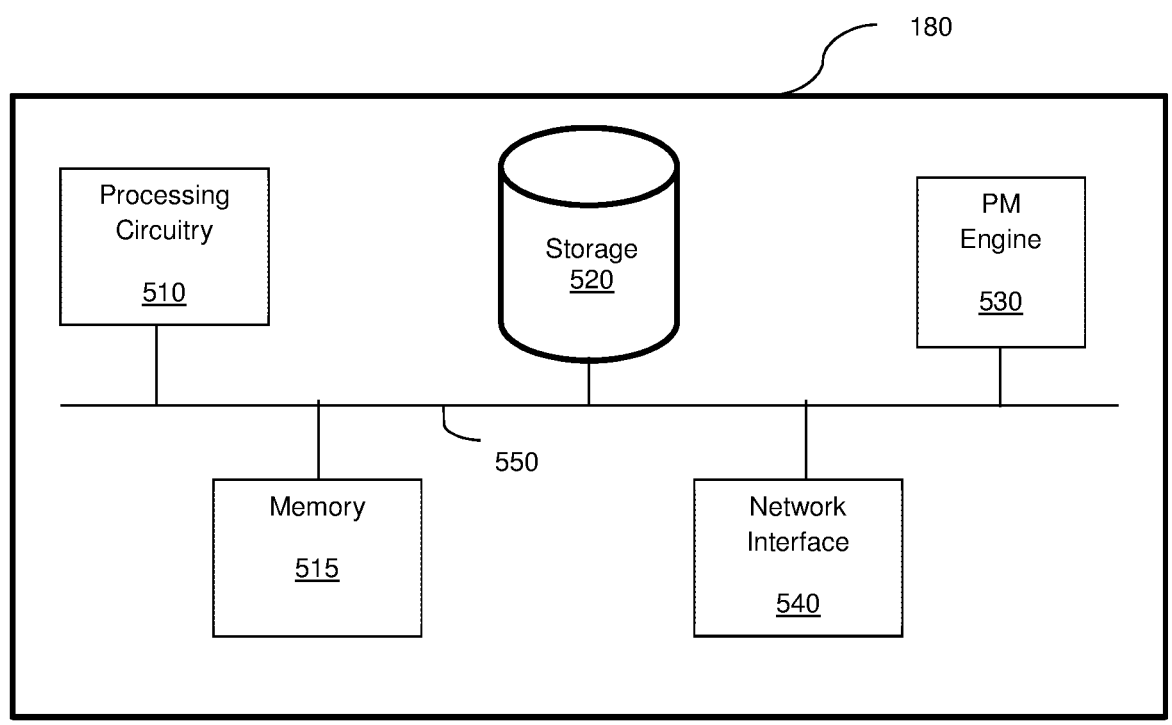
FIG. 5 is a schematic diagram of a mitigator-controller according to an embodiment.

FIG. 5 is an example schematic diagram of the PMAG 180 according to an embodiment. The PMAG 180 includes a processing circuitry 510 coupled to a memory 515, a storage 520, a proactive mitigation (PM) engine 530, and a network interface 540. In another embodiment, the components of the PMAG 180 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 515 may be volatile (e.g., RAM, etc.), non-volatile (e.g., ROM, flash memory, etc.), or a combination thereof. In one configuration, computer readable instructions to implement one or more embodiments disclosed herein may be stored in the storage 520.

In another embodiment, the memory 515 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various processes described herein. Specifically, the instructions, when executed, cause the processing circuitry 510 to perform the embodiments described herein.

The storage 520 may be magnetic storage, optical storage, and the like, and may be realized, for example, as flash memory or other memory technology, CD-ROM, Digital Versatile Disks (DVDs), or any other medium which can be used to store the desired information. The storage 520 may include workflow schemes as described herein.

The proactive mitigation engine 530 is configured to proactively mitigate DDoS attacks as described herein. Specifically, the proactive mitigation engine 530 is configured to select workflow schemes (e.g., workflow schemes stored in the storage 520) based on predicted future attacks.

The network interface 540 allows the PMAG 180 to communicate with the data sources 150 for the purpose of, for example, receiving network and traffic data.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for reducing a time to mitigate future attacks that are part of an on-going distributed denial of service (DDoS) campaign, comprising:
    receiving a plurality of attack feeds on at least one protected object in a secured environment;
    analyzing the plurality of attack feeds to determine characteristics of an on-going DDoS attack campaign comprising multiple attacks that take place over time against the secured environment, at least one of the multiple attacks of the on-going DDoS attack campaign starting at a time in the future relative to at least one other one of the multiple attacks of the on-going DDoS attack campaign;
    determining a set of optimal mitigation resources assigned to the secured environment;
    selecting, based on the set of optimal mitigation resources and the on-going DDoS attack campaign characteristics, at least one optimal workflow scheme; and
    initiating a proactive mitigation action to mitigate a predicted future attack of the on-going DDoS attack campaign by setting each mitigation resource in the set of optimal mitigation resources according to the selected optimal workflow scheme.

2. The method of claim 1, wherein the plurality of attack feeds include at least one of: attack detection indications, attack insights, and attack predictions.

3. The method of claim 1, wherein receiving the plurality of attack feeds further comprises:
    receiving supplementary data feeds; and
    analyzing the supplementary data feeds together with the plurality of attack feeds to determine the on-going DDoS attack campaign characteristics.

4. The method of claim 3, wherein the supplementary data feeds include relevant data gathered from at least one of: Border Gateway Patrol (BGP), Simple Network Management Protocol (SNMP), Remote Authentication Dial-In User Services (RADIUS), Policy and Charging Rules Function (PCRF), active domain name service (DNS) queries, DNS-Flow, logs, FarSight DNSDB, MaxMind, GeoIP, Shodan, Threat Intelligence and IP reputation feeds and Layer 7 entities (FW, LB, SWG and such) data, SOC/NOC BI systems logs and data.

5. The method of claim 3, further comprising:
analyzing the supplementary data feeds and the plurality of attack feeds using a machine learning engine.

6. The method of claim 4, further comprising:
creating an optimal workflow scheme to optimally meet the on-going DDoS attack campaign characteristics using the set of optimal mitigation resources.

7. The method of claim 1, wherein selecting, based on the set of optimal mitigation resources and the on-going DDoS attack campaign characteristics, further comprises:
updating an existing workflow scheme to optimally meet the DDoS attack campaign characteristics and the mitigation resources.

8. The method of claim 1, further comprising:
checking if the on-going DDoS attack campaign has been mitigated; and
updating the at least one optimal workload scheme with new provisions, when the on-going DDoS attack campaign has not been mitigated.

9. The method of claim 1, wherein determining the set of optimal mitigation resources further comprise:
checking at least one of: location, type, status and availability of each mitigation resource assigned to the secured environment.

10. The method of claim 1, wherein selecting the at least one optimal workflow scheme defines at least a mitigation action and information for provisioning each mitigation resource in the set of optimal mitigation resources to execute the mitigation action.

11. The method of claim 1, wherein the optimal workflow scheme further comprises:
an operation regimen defining actions to be performed and a set of parameters for the actions, provisioning instructions, triggering criteria for initiating the operation regimen, triggering criteria for terminating the operation regimen resources, detecting trigger events, classifications of network entities to protect.

12. The method of claim 11, wherein setting the proactive mitigation further comprising:
performing at least one proactive mitigation action defined in the operation regimen upon satisfaction of the triggering criteria for initiating the operation regimen.

13. The method of claim 1, wherein the method is performed by a system deployed in a backbone network.

14. The method of claim 1, wherein the proactive mitigation action is performed by a cloud service.

15. The method of claim 1, wherein selecting at least one optimal workflow scheme defines a plurality of attack signatures utilized to mitigate the on-going DDoS attack campaign against the secured environment.

16. A non-transitory computer readable medium having stored thereon instructions for causing a processing circuitry to execute the method according to claim 1.

17. A system for reducing a time to mitigate future attacks that are part of an on-going distributed denial of service (DDoS) campaign, comprising:
a processing circuitry; and
a memory, the memory containing instructions that, when executed by the processing circuitry, configure the system to:
receive a plurality of attack feeds on at least one protected object in a secured environment;
analyze the plurality of attack feeds to determine characteristics of an on-going DDoS attack campaign comprising multiple attacks that take place over time against the secured environment, at least one of the multiple attacks of the on-going DDoS attack campaign starting at a time in the future relative to at least one other one of the multiple attacks of the on-going DDoS attack campaign;
determine a set of optimal mitigation resources assigned to the secured environment;
select, based on the set of optimal mitigation resources and the on-going DDoS attack campaign characteristics, at least one optimal workflow scheme; and
initiate a proactive mitigation action to mitigate a predicted future attack of the on-going DDoS attack campaign by setting each mitigation resource in the set of optimal mitigation resources according to the selected optimal workflow scheme.

* * * * *